(12) United States Patent
Sumitsuji

(10) Patent No.: US 12,156,515 B2
(45) Date of Patent: Dec. 3, 2024

(54) FEEDING TOOL FOR PETS

(71) Applicant: DoggyMan H. A. Co., Ltd., Osaka (JP)

(72) Inventor: Tomoya Sumitsuji, Osaka (JP)

(73) Assignee: DOGGYMAN H. A. CO., LTD., Osaka (JP)

( * ) Notice: Subject to any disclaimer, the term of this patent is extended or adjusted under 35 U.S.C. 154(b) by 0 days.

(21) Appl. No.: 18/196,056

(22) Filed: May 11, 2023

(65) Prior Publication Data
US 2024/0147958 A1    May 9, 2024

(30) Foreign Application Priority Data

Nov. 7, 2022 (JP) .................. 2022-178359

(51) Int. Cl.
*A01K 5/01* (2006.01)

(52) U.S. Cl.
CPC .................. *A01K 5/0114* (2013.01)

(58) Field of Classification Search
CPC ... A01K 5/0114; A01K 5/0135; A01K 5/0142
USPC .............................. 119/61.5–61.57
See application file for complete search history.

(56) References Cited

U.S. PATENT DOCUMENTS

| | | | | |
|---|---|---|---|---|
| 1,814,776 A * | 7/1931 | Waugh | ................... | B43M 11/02 222/403 |
| D180,346 S * | 5/1957 | Weil | .............................. | D30/122 |
| 3,152,576 A * | 10/1964 | Faurot | .................. | A01K 5/0135 D30/129 |
| 3,455,280 A * | 7/1969 | Keene | .................. | A01K 5/0128 D30/129 |
| 3,459,159 A * | 8/1969 | Reed | ..................... | A01K 5/0216 119/51.03 |
| 4,386,582 A * | 6/1983 | Adsit | ................... | A01K 5/0216 119/51.03 |
| 5,113,798 A * | 5/1992 | Rera | ..................... | A01K 5/0142 119/51.5 |
| 6,237,800 B1 * | 5/2001 | Barrett | ...................... | A45F 3/16 215/312 |
| 7,225,583 B1 * | 6/2007 | Stacy | ..................... | A01K 97/02 43/44.99 |
| 9,756,835 B1 * | 9/2017 | Ottosson | ............... | A01K 5/0135 |
| 10,791,710 B1 * | 10/2020 | White | ..................... | A01K 15/02 |
| 11,419,309 B2 * | 8/2022 | Lentz | ..................... | A01K 15/02 |

(Continued)

FOREIGN PATENT DOCUMENTS

DE    202015003253 U1 *   7/2015   ........... A01K 15/025
DE    202017105373 U1 *  10/2017

(Continued)

OTHER PUBLICATIONS

Merged document GB_2351000 (Year: 2000).*

(Continued)

*Primary Examiner* — Morgan T Jordan
(74) *Attorney, Agent, or Firm* — WHDA, LLP

(57) ABSTRACT

The present invention relates to a tool that can supply liquid pet foods little by little, comprising: a sphere, a container that rotatably supports the sphere and houses a fluid pet food, and a cover that covers the container and has an opening that exposes the sphere in the container to the outside. The pet food adhered to the surface of the sphere is exposed from the opening as the sphere rotates.

4 Claims, 5 Drawing Sheets

(56) References Cited

U.S. PATENT DOCUMENTS

| | | | |
|---|---|---|---|
| 2003/0230244 A1* | 12/2003 | Morrison | A01K 7/005 119/61.54 |
| 2007/0245968 A1* | 10/2007 | Iljas | A01K 7/005 119/61.54 |
| 2008/0141945 A1* | 6/2008 | Markham | A01K 5/0142 119/61.5 |
| 2009/0025644 A1* | 1/2009 | Ebert | A01K 5/01 119/61.5 |
| 2009/0126641 A1* | 5/2009 | Anderson | A01K 5/0135 119/61.5 |
| 2010/0024735 A1* | 2/2010 | Ho | A01K 5/0225 119/51.5 |
| 2012/0318210 A1* | 12/2012 | Anderson | A01K 15/025 119/710 |
| 2013/0125823 A1* | 5/2013 | Simon | A01K 5/0114 119/61.5 |
| 2014/0048017 A1* | 2/2014 | Mainini | A01K 15/02 119/51.01 |
| 2014/0060442 A1* | 3/2014 | Ressemann | A61D 5/00 119/61.5 |
| 2014/0165920 A1* | 6/2014 | Sarty | A01K 7/005 119/72 |
| 2014/0299070 A1* | 10/2014 | Harrington | A01K 15/025 119/707 |
| 2015/0068461 A1* | 3/2015 | Lindskov | A01K 5/0135 119/51.01 |
| 2016/0037744 A1* | 2/2016 | Rudin | A01K 5/0107 119/28.5 |
| 2016/0227735 A1* | 8/2016 | Withopf | A01K 5/0114 |
| 2016/0255813 A1* | 9/2016 | Wolfe, Jr. | A01K 5/0114 |
| 2017/0112093 A1* | 4/2017 | Glinsky | A01K 5/0114 |
| 2017/0231191 A1* | 8/2017 | Yang | A01K 29/00 119/61.5 |
| 2018/0352782 A1* | 12/2018 | Miller | A01K 5/0114 |
| 2019/0000038 A1* | 1/2019 | Whitney | A01K 5/0135 |
| 2019/0075755 A1* | 3/2019 | Imaizumi | A01K 39/02 |
| 2019/0098864 A1* | 4/2019 | Simon | A01K 15/025 |
| 2021/0400910 A1* | 12/2021 | Hutton | A01K 5/0114 |
| 2022/0159930 A1* | 5/2022 | Borg | A61D 5/00 |
| 2023/0139227 A1* | 5/2023 | Ahrenholtz | A01K 5/0114 119/61.5 |
| 2023/0284589 A1* | 9/2023 | McCormick | A01K 5/0135 |
| 2024/0081275 A1* | 3/2024 | Goodwyn, Jr. | A01K 5/0114 |

FOREIGN PATENT DOCUMENTS

| | | | | |
|---|---|---|---|---|
| GB | 2351000 | A * | 12/2000 | A01K 7/00 |
| JP | 7094596 | B1 | 7/2022 | |
| KR | 20120065465 | A * | 6/2012 | |
| KR | 20160063112 | A * | 6/2016 | |
| KR | 20220059803 | A * | 5/2022 | |

OTHER PUBLICATIONS

Merged translation of KR_20120065465 (Year: 2012).*
Merged translation of DE_202015003253 (Year: 2015).*
Merged translation of KR_20160063112 (Year: 2016).*
Merged translation of DE_202017105373 (Year: 2017).*
Merged translation of KR_20220059803 (Year: 2022).*

* cited by examiner

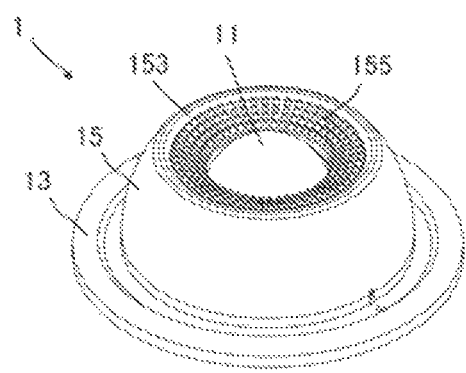
FIG. 2 (A) Perspective view
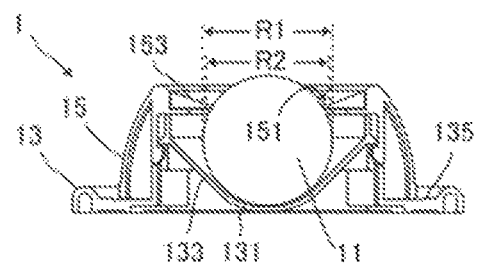
FIG. 2 (B) Longitudinal sectional view

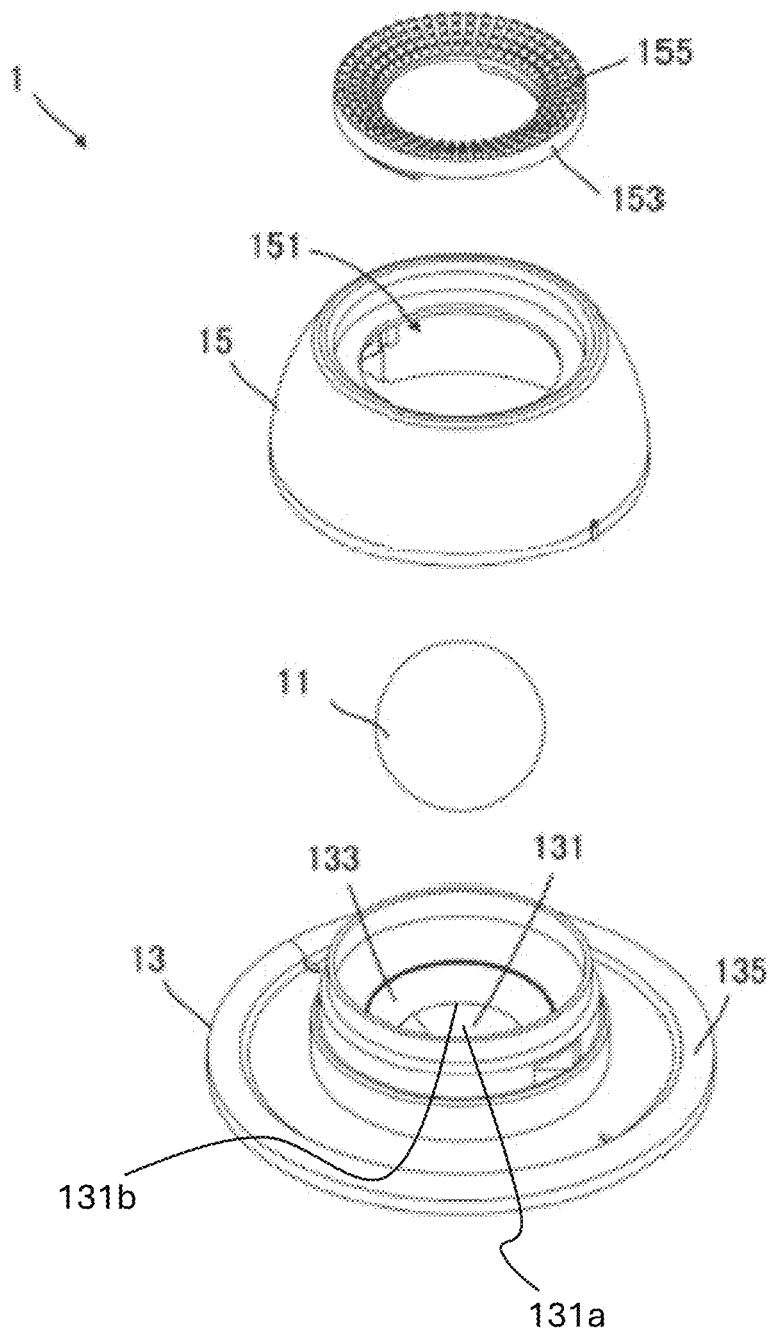

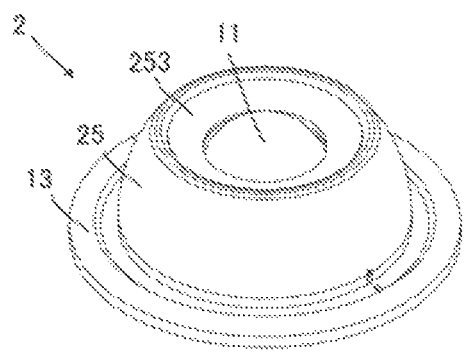
FIG. 5 (A) Perspective view
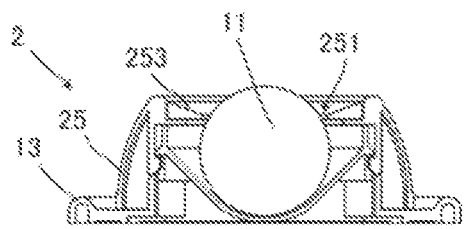
FIG. 5 (B) Longitudinal sectional view

FEEDING TOOL FOR PETS

FIELD OF THE INVENTION

The present invention relates to a feeding tool for pets, and more particularly to a feeding tool for pets that can be suitably used for liquid pet food.

BACKGROUND ART

Various proposals have been made to promote healthy slow eating in pets. For example, Patent Literature 1 (Japanese Patent No. 7094596) discloses a health care tableware for pets comprising a bowl, a bowl receiver, and a stand. In such tableware, the bowl is provided with three or four dividing members that divide the area for storing food and water into three or four areas evenly, and the dividing members are arranged radially so that the central portion of the bowl is an empty area. The bowl is provided with 3 or 4 different shaped slow feeder parts, and the bowl receiver has a receiving part with an inclination angle of 10 to 20 degrees so that the bowl is inclined at 10 to 20 degrees, the stand supports the bowl receiver so that the bowl is 0 to 15 cm lower than the pet's body height. The portion where the bowl is tilted and lowered is the front portion, and the pet takes in the food and water contained in the bowl from the front portion, and after a predetermined period of use has passed, by rotating the direction of the bowl by 120 degrees in the case of 3 areas, and by 90 degrees in the case of 4 areas, the route formed by the slow feeder section is changed.

However, such a health care tableware for pets has a complicated structure. Moreover, it is assumed to be mainly used for solid pet foods, and is not available for liquid pet foods.

PRIOR ARTS

Patent Literature

Patent Literature 1: Japanese Patent No. 7094596

SUMMARY OF THE INVENTION

Problems to be Solved by the Invention

An object of the present invention is to provide a feeding tool for pets that has a simple structure and can supply liquid pet foods little by little.

Means for Solving the Problems

In order to solve the above problems, the present invention can provide a feeding tool for pets comprising:
a sphere,
a container that rotatably supports the sphere and stores fluid pet food, and
a cover that covers the container and has an opening that exposes the sphere in the container to the outside;
wherein the pet food adhered to the surface of the sphere is exposed from the opening as the sphere rotates.

In the feeding tool for pets of the present invention, it is preferable that the cover has a slope that slopes outward from the opening.

Further, in the feeding tool for pets of the present invention, it is preferable that the inner diameter of the opening is smaller than the outer diameter of the sphere.

Further, in the feeding tool for pets of the present invention, it is preferable that the container includes a bottom portion that serves as a support surface for the sphere, and an extended portion that extends obliquely upward from the outer edge of the bottom portion.

Further, in the feeding tool for pets of the present invention, it is preferable that the slope has a plurality of protrusions.

Effect of the Invention

According to the feeding tool for pets of the present invention, the pet can eat the pet food only after rotating the sphere and exposing the pet food from the gap between the sphere and the opening. Therefore, the pet naturally eats slowly, leading to promotion of the health of the pet. Namely, the present invention can provide a feeding tool for pets that has a simple structure and can supply liquid pet foods little by little.

BRIEF EXPLANATION OF DRAWINGS

FIGS. 2(A) and 2(B) are a perspective view and a longitudinal sectional view of the feeding tool for pets 1.

FIG. 3 is an exploded perspective view of the feeding tool for pets 1.

FIGS. 5(A) and 5(B) are a perspective view and a longitudinal sectional view of a feeding tool for pets 2 according to Embodiment 2.

PREFERRED EMBODIMENTS

In the following, the feeding tool for pets according to the typical embodiments of the present invention is explained in detail by referring the drawings. However, the present invention is not limited to these drawings, and can include various modifications within the scope of the present invention. Since the drawings are to use for explaining the present invention conceptually, for showing the present invention clearly, there is a case where sizes, ratios or number may be shown in the exaggerated or simplified manner, as occasion demand.

1. Embodiment 1

A feeding tool for pets 1 according to Embodiment 1 will be described with reference to FIGS. 1 to 4. In the present embodiment, a dog is assumed as a suitable pet P (see FIG. 1), but the present invention is not limited to dogs.

Figure 1:
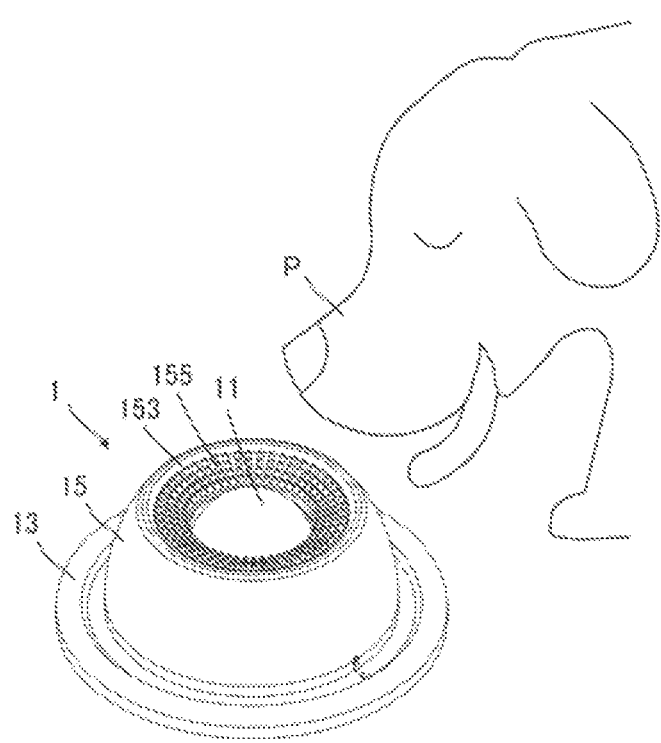
FIG. 1 is a schematic diagram of a feeding tool for pets 1 according to Embodiment 1.

The feeding tool for pets 1 can also be called a pet tableware, and, for example, as shown in FIG. 1, includes a sphere 11, a container 13 and a cover 15. Although this feeding tool for pets 1 is made of a resin material, it is not limited thereto.

Figure 4:
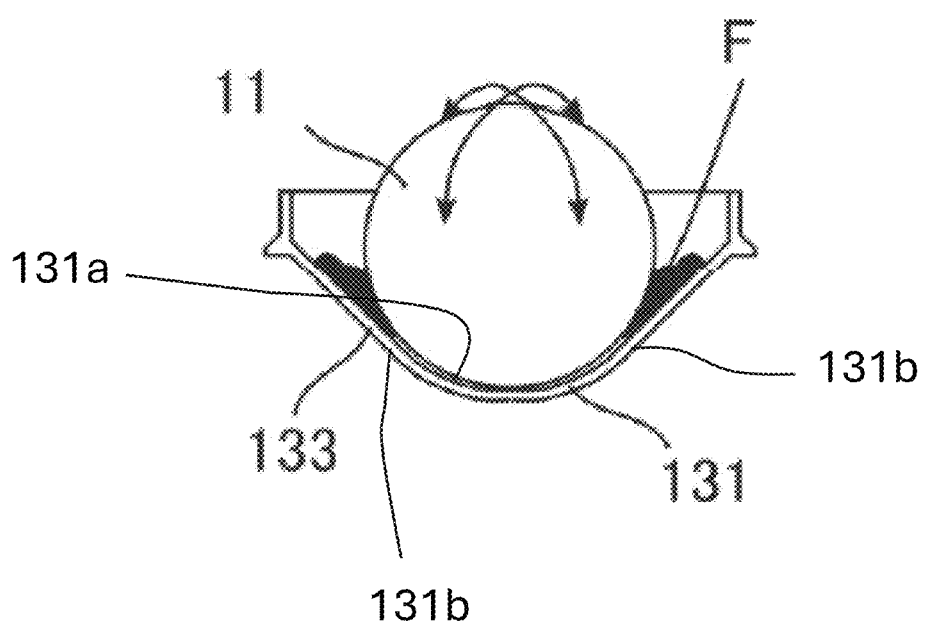
FIG. 4 is a diagram illustrating how the sphere 11 rotates within the container 13 and the pet food F is adhered thereto.

The sphere (ball) 11 rotates within the container 13 when the pet P licks it (see FIG. 4). The sphere 11 is preferably hollow, but is not limited thereto and maybe solid. For example, unevenness or grooves may be formed on the surface of the sphere 11 so as to adhere the pet food F onto the surface easily.

The sphere 11 is preferably made of resin such as ABS resin, but may be made of other materials such as wood. As the sphere 11, for example, a table tennis ball can be used substitutedly.

The container 13 rotatably supports the sphere 11 and houses the fluid pet food F in contact with the sphere 11 (see FIG. 4).

Here, the pet food F may have enough viscosity to adhere to the sphere 11. In addition, it is preferable that the pet food F has a fluidity so as to flow from the slope portion 133 toward the bottom portion 131 when put into the container 13. Therefore, the pet food F may be a pet food which has such a viscosity and a fluidity as long as the food can be used in the feeding tool for pets 1 according to the present embodiment, and for example, may be in the form of fluid such as liquid, dispersion, solution, paste, and the like.

Further, as shown in FIG. 2(B), the container 13 includes a bottom portion 131 that serves as a support surface for the sphere 11, and an extended portion 133 that extends obliquely upward from the outer edge of the bottom portion 131. Namely, the bottom portion 131 has a bowl shape consisting of a streamlined and curved concave portion and serves to rotatably hold the sphere 11 between the bottom portion and the opening 151 of the cover 15. The extended portion 133 has a role to flow the pet food F to the bottom portion 131 side by utilizing the inclination thereof.

It is preferable that the bottom portion 131 and the extended portion 133 are integrally molded. Further, it is preferable that the bottom portion 131 and the inclined extended portion 133 are connected smoothly (that is, without a step). This allows the pet food F on the extended 133 to flow toward the bottom 131 without remaining in the boundary area between the bottom 131 and the extended portion 133 (see FIG. 4).

From the viewpoint that the pet food F smoothly flows from the extended portion 133 to the bottom portion 131 side, it is preferable that the angle of the inclined extended portion 133 is 300 to 60°.

The container 13 has a leg portion 135 extending outward along the grounding surface of the container 13. The leg portion 135 suppresses overturning and movement of the feeding tool for pets 1.

A non-slip (not shown) may be attached to the back surface of the leg portion 135 to prevent movement. It is preferable that rubber is used as a non-slip material, but is not limited thereto.

The cover 15 is, for example, a dome-shaped member that covers the container 13 (see FIG. 3). The cover 15 has an opening 151 that exposes the sphere 11 inside the container 13.

It is preferable that the inner diameter R2 of the opening 151 is smaller than the outer diameter R1 of the sphere 11 (see FIG. 2(B)). Thereby, the sphere 11 can be allowed to be held between the container 13 and the cover 15, which results in preventing the sphere 11 from falling off.

Furthermore, considering the viewpoint of sufficient exposure of the sphere 11, it is preferable that the outer diameter of the sphere 11 should be about 1 mm to 10 mm smaller than the inner diameter of the opening 151 (that is, the gap between the sphere 11 and the opening 151 should be around 1 mm to 10 mm).

It is preferable that the cover 15 has a slope 153 that slopes upward from the opening 151 toward the outside. The slope 153 is called also as the inclined portion, for example, and allows the pet P to easily lick the sphere 11.

In the present embodiment, the slope 153 is configured as a separate part from the main body of the cover 15. Thereby, the part that the pet P licks can be made softer than the main body of the cover 15, and thus, the pet P can be protected. However, the slope 153 may be formed integrally with the body of the cover 15.

Particularly when the pet P is a dog, it is preferable that the slope 153 has a plurality of brushes or protrusions 155. When the sphere 11 is licked, since the tongue of the pet P comes into contact with the protrusions 155, the tongue of the pet P can be kept clean.

The outer diameter, height and spacing of the protrusions 155 can be appropriately set according to the type and size of the pet P.

Next, a method for using the feeding tool for pets 1 will be explained.

The user removes the cover 15 from the feeding tool for pets 1 and puts the pet food F into the container 13. Then, the cover 15 is attached to the container 13. When the user replenishes the pet food F to the feeding tool for pets 1, the feeding tool for pets 1 is washed as necessary, and the above procedures are repeated. Since the feeding tool for pets 1 has a simple structure, the above procedures are easy and the feeding tool for pets 1 is less likely to get dirty.

When a pet P (for example, a dog) licks the sphere 11 as illustrated in FIG. 1, the sphere 11 rotates within the container 13 as shown in FIG. 4. The rotation of the sphere 11 causes the pet food F to adhere to the surface of the sphere 11. Then, the pet food F on the sphere 11 moves upward according to the rotation of the sphere 11 and is exposed to the outside from the opening 151, and the pet P eats the exposed pet food F.

Namely, the pet P can lick the pet food F only after rotating the sphere 11. Therefore, the user can make the pet P lick the pet food F little by little. Thereby, it is possible to suppress that the pet P eats the pet food F too much, which results in health care of the pet P.

Further, in the container 13, the bottom portion 131 and the extended portion 133 may be smoothly connected without a step, or may be provided with a stepped scale. The scale may be composed of a substantially horizontal annular projection, and can be used as a measure of the amount of pet food F to be put into the container 13. Therefore, the pet food F smoothly flows from the extended portion 133 to the bottom portion 131 side, and tends to always adhere to the sphere 11. Accordingly, almost all of the pet food F put into the container 13 adheres to the spheres 11. Therefore, the pet P can lick almost all of the pet food F in the container 13, and reduction of unlicked food can be expected.

2. Embodiment 2

A feeding tool for pets 2 according to Embodiment 2 will be described with reference to FIG. 5. In this embodiment, a cat is assumed as a suitable pet P, but it is not limited thereto.

The feeding tool for pets 2 includes a sphere 11, a container 13 and a cover 25, similar to the feeding tool for pets 1 of Embodiment 1. As the sphere 11 and the container 13, the same ones as in Embodiment 1 can be used, so detailed description thereof will be omitted.

The cover 25 is, for example, a dome-shaped member that covers the container 13 and has an opening 251 that exposes the sphere 11 inside the container 13.

The cover 25 has a slope 253 that slopes upward from the opening 251 toward the outside. However, no protrusions or brushes are formed on the slope 253, and the surface of the slope 253 is smooth. Since a tongue of cats has small protrusions called filiform papillae, the surface of the slope 253 is made smooth so that the licking action of the cat is not prevented.

The specific aspects of the feeding tool for pets according to the embodiments of the present invention have been described above, but the present invention is not limited to these, and various design changes are possible. Such matters relating to the design changes are also included in the technical scope of the present invention.

The invention claimed is:

1. A feeding tool for pets comprising:
   a sphere,
   a container that rotatably supports the sphere and houses a fluid pet food, and
   a cover that covers the container and has an opening that exposes the sphere in the container to an outside;
   wherein the pet food adhered to the surface of the sphere is exposed from the opening as the sphere rotates,
   the cover has a slope that slopes upwardly toward the outside from the opening, and
   the container comprises a bottom comprising a bottom portion having an upper surface and a circular outer edge, and an extended portion extending obliquely upward from the circular outer edge to become apart from the sphere, the sphere being placed on the upper surface and rotating thereon.

2. The feeding tool for pets according to claim 1, wherein a diameter of the opening is smaller than a diameter of the sphere.

3. The feeding tool for pets according to claim 1, wherein the slope has a plurality of protrusions.

4. The feeding tool for pets according to claim 1, wherein the bottom portion and the extended portion are connected integrally and smoothly, having a bowl shape to rotatably hold the sphere between the bottom portion and the opening of the cover.

* * * * *